United States Patent [19]

Ferrari

[11] Patent Number: 4,751,041

[45] Date of Patent: Jun. 14, 1988

[54] BURNABLE NEUTRON ABSORBER ELEMENT

[75] Inventor: Harry M. Ferrari, Edgewood Boro, Pa.

[73] Assignee: Westinghouse Electric Corp., Pittsburgh, Pa.

[21] Appl. No.: 819,086

[22] Filed: Jan. 15, 1986

[51] Int. Cl.$^4$ ................................................ G21C 7/04
[52] U.S. Cl. ...................................... 376/327; 376/339; 376/423; 376/447
[58] Field of Search .............. 376/327, 333, 339, 423, 376/447, 419, 417

[56] References Cited

U.S. PATENT DOCUMENTS

| | | | |
|---|---|---|---|
| 3,049,487 | 8/1962 | Harrer et al. | 204/193.2 |
| 3,119,747 | 1/1964 | Wallace et al. | 176/71 |
| 3,150,052 | 9/1964 | Stoker et al. | 176/54 |
| 3,267,000 | 8/1966 | Ashcroft et al. | 176/68 |
| 3,334,019 | 8/1967 | Bogaardt et al. | 176/40 |
| 3,342,692 | 9/1967 | Bourrasse et al. | 376/417 |
| 3,356,618 | 12/1967 | Didcot et al. | 252/478 |
| 3,382,153 | 5/1968 | Bigge et al. | 176/40 |
| 3,510,398 | 5/1970 | Wood | 176/86 |
| 3,679,545 | 7/1972 | Leirvik | 376/327 |
| 3,822,185 | 7/1974 | Wetch et al. | 176/70 |
| 3,985,514 | 10/1976 | Miller | 376/327 |
| 4,100,020 | 7/1978 | Andrews | 376/417 |
| 4,186,050 | 1/1980 | West et al. | 376/419 |
| 4,342,722 | 8/1982 | Blum | 376/327 |
| 4,460,540 | 7/1984 | Funk et al. | 376/327 |
| 4,473,410 | 9/1984 | Grubb et al. | 376/417 |
| 4,474,728 | 10/1984 | Radford | 376/339 |
| 4,591,479 | 5/1986 | Weitzberg | 376/423 |
| 4,664,878 | 5/1987 | Wilson et al. | 376/327 |

FOREIGN PATENT DOCUMENTS

| | | | |
|---|---|---|---|
| 0124775 | 11/1984 | European Pat. Off. | 376/447 |
| 0041696 | 4/1978 | Japan | 376/447 |
| 820219 | 9/1959 | United Kingdom | 376/339 |
| 938395 | 9/1963 | United Kingdom | 376/333 |
| 1056950 | 2/1967 | United Kingdom | 376/339 |
| 2064201 | 6/1981 | United Kingdom | 376/417 |

OTHER PUBLICATIONS

"Reactor Handbook, vol. I, Materials," ed. Tipton, Interscience Publishers, Inc., New York, (1960), pp. 777-782, 790-805, 835-837, and 955-960.

Primary Examiner—Harvey E. Behrend
Attorney, Agent, or Firm—John J. Prizzi; Donald M. Satina

[57] ABSTRACT

A burnable, thermal neutron absorber element is provided with a zirconium alloy elongate container having sealed therein both a burnable absorber and the solid moderator material, zirconium hydride. The zirconium hydride is in a concentration and position to enhance the neutron capture efficiency of said thermal neutron absorber in a light water reactor neutron irradiation environment.

10 Claims, 1 Drawing Sheet

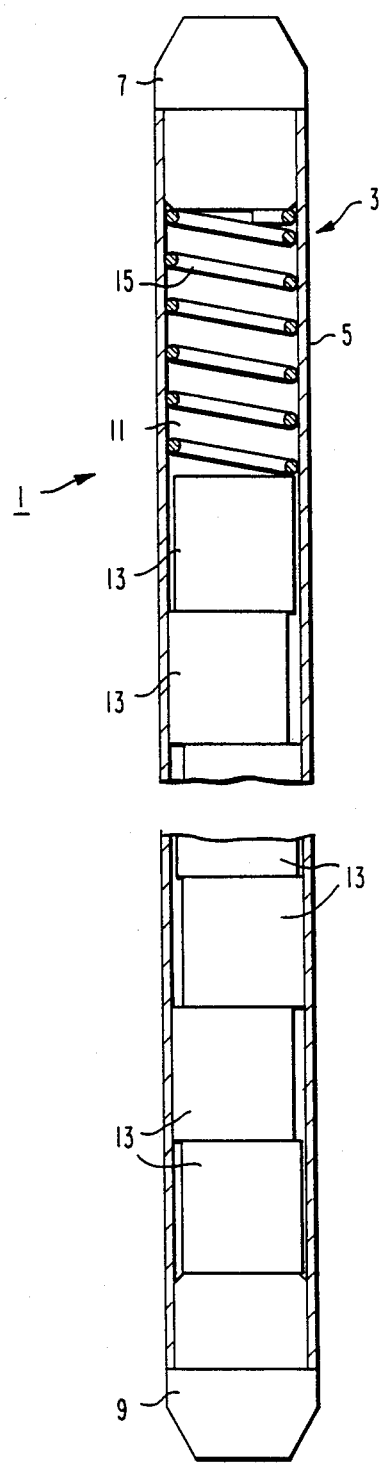

BURNABLE NEUTRON ABSORBER ELEMENT

BACKGROUND OF THE INVENTION

The present invention relates to burnable absorbers (poisons) used in light water reactors. It is especially concerned with those burnable absorbers which are used in reactors as discrete poison rods (i.e., not mixed with fuel in a fuel rod).

In the past, commercial light water reactors have utilized burnable poisons such as boron compounds and gadolinia to extend the fuel cycle by allowing higher levels of $U^{235}$ to be present at the beginning of the fuel cycle. In some designs, gadolinia has been mixed directly with the $UO_2$ to form fuel elements containing pellets composed of $UO_2$ and $Gd_2O_3$. In other designs, the fuel pellets may be coated with a boron compounds, such as $ZrB_2$.

In addition to the foregoing designs in which the fuel rods contained both a fissile material and a burnable absorber, the burnable absorber may also be dissolved in the coolant and/or be present in separate, stationary or mobile, (non-fueled) burnable absorber elements.

Prior designs of burnable absorber elements (see, for example, U.S. Pat. Nos. 3,510,398 and 4,342,722, which are hereby incorporated by reference in their entirety) have included a hermetically sealed zirconium alloy or stainless steel tubular rod containing a tubular member of borosilicate glass as the burnable absorber. Concentrically inside of the borosilicate glass was a smaller diameter zirconium alloy or stainless steel tube which provided structural support for the borosilicate glass. The remainder of the interior of the rod was filled with a gas, such as helium.

An improvement on the foregoing burnable absorber element has been marketed by the Westinghouse Electric Corporation and is known as a WABA (Wet Annular Burnable Absorber) rod. The WABA design includes a pair of concentrically disposed zirconium alloy tubes having an outer diameter and a length essentially the same as a fuel rod. The similarity in size permits the WABA rod to be statically positioned in aligned fuel assembly grid cells in the same manner as fuel rod or to be used as a movable poison element which may be positioned in a thimble guide tube of a fuel assembly. Annular burnable poison pellets containing B4C are disposed in the narrow annular space between the concentric tubes, which has been sealed shut by end plugs welded onto the tube ends. However, the hollow portion of the inner tube is not plugged and therefore permits the unimpeded flow of aqueous coolant upwardly through the inner tube during the time of operation in the water reactor. Examples of WABA rods are described in U.S. Pat. Nos. 4,460,540 and 4,474,728. These patents are hereby incorporated by reference in their entirety.

BRIEF SUMMARY OF THE INVENTION

Significant improvements in the prior art burnable absorber designs may be obtained through the use of my invention. In accordance with my invention, a burnable thermal neutron absorber element is provided which includes an elongated, sealed container holding a burnable thermal neutron absorber material and zirconium hydride. Both the burnable absorber and zironcium hydride are distributed along the length of the container as needed and the zirconium hydride acts as a neturon moderator thereby enhancing the neutron capture efficiency of the burnable thermal neutron absorber in a water reactor neutron irradiation environment.

In a preferred embodiment of the present invention, the aforementioned container is a tube which has an end plug joined to each of its ends to form a hermetically sealed cavity within the tube, and which holds the aforementioned zirconium hydride and burnable absorber material. Preferably, the zirconium hydride is in the form of generally cylindrical pellets stacked on end to form a cylindrical column which rests on one of the end plugs.

It is also preferred that the burnable neutron absorber used herein is a boron containing material or compound.

It is further preferred that the zirconium hydride be in a partially hydrided state, preferably with a H to Zr ratio, on an atomic basis, in the range of about 1.0 to about 1.8, and more preferably about 1.5 to 1.8.

These and other aspects of the present invention will become more apparent upon review of the following detailed description of the invention in conjunction with the drawing which is briefly described immediately below.

BRIEF DESCRIPTION OF THE DRAWING

The FIGURE shows longitudinal cross-section through an embodiment of a burnable thermal neutron absorber element in accordance with the present invention.

DETAILED DESCRIPTION OF THE INVENTION

In my invention, zirconium hydride is combined with a burnable poison in a non-fueled burnable absorber element. Compared to the prior WABA design, a significant advantage is obtained when the burnable poison is a boron containing material. This advantage is due to the use of the solid moderating material zirconium hydride which contains a significantly higher concentration of the moderator, hydrogen, compared to the water used in the WABA design. This higher concentration of hydrogen results in a more efficient moderation of the neutrons found in a light water reactor irradiation environment and thus significantly improves the probability of the burnable poison, boron, capturing a neutron.

FIG. 1 shows a longitudinal cross-section through an embodiment of a burnable thermal neutron absorber element 1 in accordance with my invention. The element 1 includes an elongated container 3 which is preferably a tubular member 5, preferably of circular transverse cross section, and which has a top end plug 7 and a bottom end plug 9 welded to its ends to form a hermetically sealed cavity 11 within the container 3. The materials for the tube 5 and end plugs are preferably selected from those stainless steels and zirconium alloys having excellent aqueous corrosion resistance in light water reactor environments. Most preferably one of the commercial alloys, Zircaloy-2 or 4 is utilized for these components.

Held within the container 3 is the zirconium hydride and the burnable poison, preferably boron. Preferably the zirconium hydride is in the form of generally cylindrical pellets 13 stacked on end to form a generally cylindrical column which is held against the bottom end plug 9 by a spring 15 or similar means, located between the top end plug 7 and the top pellet 13 in the column of pellets.

Each zirconium hydride pellet preferably has a H to Zr ratio, on an atomic basis, in the range of about 1.0 to about 1.8, and more preferably about 1.5 to about 1.8. While it is desirable to maximize the H to Zr ratio to maximize the concentration of the moderator H in the element, the hydrogen to zirconium ratio should be held below about 1.8 to limit the amount of gaseous H that may evolve from the zirconium hydride pellets during the reactor usage, since the hydrogen can cause hydriding of the container 3 material and may adversely affect its mechanical properties. In this regard, the inside diameter surface of the tube 5 may preferably have a hydrogen diffusion barrier on it. Where the tube 3 is made of Zircaloy its inside diameter surface may be preoxidized to limit hydrogen absorption. Alternatively or, in addition to preoxidation of the interior surface of tube, the atmosphere within the cavity rather than being composed entirely of an inert atmosphere, such as helium, may include an oxidizing component to oxidize the interior of the tube 5 during use in reactor, as is described in my copending application Ser. No. 552,227 filed on Nov. 16, 1983 U.S. Pat. No. 4,609,524, which is hereby incorporated by reference in its entirety. As described in my copending application this oxidizing component may be selected from oxygen, carbon monoxide, and carbon dioxide, and be present in an amount effective (e.g. 2–3 volume percent based on the volume of helium) to form an oxide coating on internal surface of the container 3.

The pellets 13 may be formed by pressing and sintering zirconium hydride powder. The zirconium hydride powder may be formed by conventional hydriding techniques utilizing zirconium or a zirconium alloy (e.g. Zircaloy-2 or 4) stock as a starting material, which is hydrided to the desired or higher hydrogen concentration and then committed to zirconium hydride powder.

The starting powder may contain more hydrogen than that desired in the final pellet in order to compensate for hydrogen which may be lost during pellet sintering.

The burnable poison, may be incorporated into the element 1 in a number of differing manners. For example, the zirconium or zirconium alloy starting stock for producing the hydride power may be prealloyed with boron to the concentration desired. Alternatively, a particulate boron compound, such as $B_4C$, may be blended with the zirconium hydride powder, and then pressed and sintered to form pellets 13 having the particulate boron compound substantially homogenously dispersed through a matrix of zirconium hydride. The $B_4C$ particles may be coated with a diffusion barrier material, such as niobium.

In the foregoing manner, the zirconium hydride and burnable absorber are distributed along the length of the container 3 in a location and length substantially equal to the location and length ($\pm 20\%$) of the enriched fuel pellets in the surrounding fuel elements of the reactor assembly. While the concentration of boron is a matter of choice, a concentration of 0.006 gm $B^{10}$/(cm of height) is now contemplated. It is further contemplated that the tube 5 may have an outside diameter of about 0.381 inches and a wall thickness of about 0.026 inches, while the pellets 13 have a diameter of about 0.318 inches, substantially filling the container, when viewed in transverse cross section.

The preceding description has clearly demonstrated the benefits obtainable through the practice of the present invention. Other embodiments of the invention will become more apparent to those skilled in the art from a consideration of the specification or actual practice of the invention disclosed herein. It is intended that the specification and examples be considered as exemplary only, with the true scope and spirit of the invention being indicated by the following claims.

I claim:

1. A burnable thermal neutron absorber element comprising:
   a zirconium alloy elongated tubular container having an inside diameter surface;
   hydrogen diffusion barrier means for limiting hydrogen diffusion from within said container into said zirconium alloy;
   a boron-containing burnable thermal neutron absorber material sealed within said zirconium alloy elongated container, said boron-containing burnable absorber material being in a particle form, said particles of absorber material being coated with a diffusion barrier material;
   zirconium hydride sealed within said zirconium alloy elongated container, said zirconium hydride being in a partially hydrided condition and having a H to Zr ratio on an atomic basis in the range of about 1.0 to about 1.8;
   said burnable thermal neutron absorber material and said zirconium hydride distributed along the length of said zirconium alloy elongated container; and
   said zirconium hydride acts as a neutron moderator thereby enhancing the neutron capture efficiency of said burnable thermal neutron absorber.

2. The burnable absorber element according to claim 1 wherein said zirconium hydride has a H to Zr ratio, on an atomic basis, in the range of about 1.5 to about 1.8.

3. A non-fueled burnable thermal neutron absorber element comprising:
   a zirconium base alloy tube;
   a hydrogen diffusion barrier about the inside diameter surface of said tube;
   an end plug joined to each end of said tube to form a hermetically sealed cavity;
   zirconium hydride contained within said cavity, said zirconium hydride having a H to Zr ratio on an atomic basis in the range of about 1.0 to about 1.8;
   a boron-containing burnable thermal neutron absorber material and said zirconium hydride distributed along the length of said tube, said boron-containing burnable absorber material being in a particle form, said particles of absorber material being coated with a diffusion barrier material; and
   said zirconium hydride positioned with respect to said burnable absorber to act as a neutron moderator thereby enhancing the neutron capture efficiency of said burnable thermal neutron absorber.

4. The burnable absorber element according to claim 3 wherein said zirconium hydride is comprised of generally cylindrical pellets stacked on end against one of said end plugs to form a substantially cylindrical column of zirconium hydride.

5. The burnable absorber element according to claim 1 wherein said means for limiting hydrogen diffusion into said zirconium alloy container comprise a zirconium oxide layer about said inside diameter surface of said container.

6. The burnable absorber element according to claim 1 wherein said boron-containing burnable absorber consists essentially of boron carbide.

7. The burnable absorber element according to claim 6 wherein said diffusion barrier material consists essentially of niobium.

8. The burnable absorber element according to claim 3 wherein said zirconium hydride has a H to Zr ratio on an atomic basis in the range of about 1.5 to about 1.8.

9. The burnable absorber element according to claim 3 wherein said boron-containing burnable absorber consists essentially of boron carbide.

10. The burnable absorber element according to claim 9 wherein said diffusion barrier material consists essentially of niobium.

* * * * *